(12) United States Patent
Nakashimo et al.

(10) Patent No.: US 9,323,258 B2
(45) Date of Patent: Apr. 26, 2016

(54) VOLTAGE REGULATOR

(71) Applicant: Seiko Instruments Inc., Chiba-shi, Chiba (JP)

(72) Inventors: Takao Nakashimo, Chiba (JP); Tadashi Kurozo, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 14/639,681

(22) Filed: Mar. 5, 2015

(65) Prior Publication Data

US 2015/0177752 A1    Jun. 25, 2015

Related U.S. Application Data

(63) Continuation of application No. PCT/JP2013/068815, filed on Jul. 10, 2013.

(30) Foreign Application Priority Data

Sep. 7, 2012  (JP) ................. 2012-197541

(51) Int. Cl.
*G05F 1/569* (2006.01)
*G05F 1/10* (2006.01)
*G05F 1/56* (2006.01)

(Continued)

(52) U.S. Cl.
CPC .. *G05F 1/10* (2013.01); *G05F 1/56* (2013.01); *G05F 1/575* (2013.01); *H02M 1/32* (2013.01)

(58) Field of Classification Search
CPC ............ G05F 1/575; G05F 1/56; G05F 1/573

USPC .................................................. 323/273–281
See application file for complete search history.

(56) References Cited

U.S. PATENT DOCUMENTS 8,072,198 B2 * 12/2011 Imura .......................... 323/276
2007/0115045 A1 * 5/2007 Nagata ................... G05F 1/573
  327/540

(Continued)

FOREIGN PATENT DOCUMENTS

JP  2001-22455 A  1/2001
JP  2003-330555 A  11/2003
JP  2005-301439 A  10/2005

(Continued)

OTHER PUBLICATIONS

International Search Report, and English language translation thereof, in corresponding International Application No. PCT/JP2013/068815, dated Aug. 13, 2013, 10 pages.

*Primary Examiner* — Nguyen Tran
(74) *Attorney, Agent, or Firm* — Brinks Gilson & Lione

(57) ABSTRACT

Provided is a voltage regulator that is low in current consumption and is capable of suppressing the occurrence of an excessive overshoot at an output terminal when a power supply voltage becomes high in a non-regulated state. The voltage regulator includes: an overshoot limiting circuit for detecting an occurrence of an overshoot in an output voltage and limiting a current of the output transistor; and a non-regulated state detection circuit for detecting a non-regulated state of the voltage regulator based on a voltage of an output terminal and a current flowing through the output transistor. The overshoot limiting circuit has an operating current controlled by a detection signal of the non-regulated state detection circuit.

2 Claims, 4 Drawing Sheets

(51) Int. Cl.
*G05F 1/575* (2006.01)
*H02M 1/32* (2007.01)

(56) References Cited

U.S. PATENT DOCUMENTS

2008/0265852 A1* 10/2008 Imura .......................... 323/277
2009/0189584 A1* 7/2009 Suzuki .................... G05F 1/573
    323/284

FOREIGN PATENT DOCUMENTS

| JP | 2006-301787 A | 11/2006 |
| JP | 2009-146130 A | 7/2009 |
| JP | 2009-199501 A | 9/2009 |

\* cited by examiner

VOLTAGE REGULATOR

RELATED APPLICATIONS

This application is a continuation of PCT/JP2013/068815 filed on Jul. 10, 2013, which claims priority to Japanese Application No. 2012-197541 filed on Sep. 7, 2012. The entire contents of these applications are incorporated herein by reference.

BACKGROUND OF THE INVENTION

1. Field of the Invention

The present invention relates to an overshoot suppression circuit for a voltage regulator.

2. Description of the Related Art

A conventional voltage regulator is now described. FIG. 4 is a circuit diagram illustrating the conventional voltage regulator.

The conventional voltage regulator includes a reference voltage circuit 101, an error amplifier circuit 102, a bias circuit 103 for the error amplifier circuit 102, a PMOS transistor 104 serving as an output transistor, a voltage dividing resistor circuit 105, an amplifier 301, a bias circuit 302 for the amplifier 301, and a PMOS transistor 108.

The PMOS transistor 104 is connected between a power supply terminal and an output terminal 109. The voltage dividing resistor circuit 105 for outputting a feedback voltage Vfb is connected between the output terminal 109 and a ground terminal. The error amplifier circuit 102 has an inverting input terminal connected to the reference voltage circuit 101, a non-inverting input terminal for inputting the feedback voltage Vfb, and an output terminal connected to a gate of the PMOS transistor 104. The bias circuit 103 supplies an operating current to the error amplifier circuit 102. The PMOS transistor 108 is connected between the power supply terminal and the gate of the PMOS transistor 104. The amplifier 301 has a non-inverting input terminal connected to the reference voltage circuit 101, an inverting input terminal for inputting the feedback voltage Vfb, and an output terminal connected to a gate of the PMOS transistor 108. The bias circuit 302 supplies an operating current to the amplifier 301.

The amplifier 301 compares the input feedback voltage Vfb with a reference voltage Vref. When the feedback voltage Vfb is lower than the reference voltage Vref, the amplifier 301 outputs a Hi signal to turn OFF the PMOS transistor 108. When an overshoot occurs in an output voltage Vout of the output terminal 109 and the feedback voltage Vfb becomes higher than the reference voltage Vref, the amplifier 301 outputs a Lo signal to turn ON the PMOS transistor 108.

The conventional voltage regulator operates in the manner described above to prevent the overshoot in the output voltage Vout of the output terminal 109 from being larger (see, for example, Japanese Patent Application Laid-open No. 2005-301439).

In the conventional voltage regulator, however, there is a problem in that an excessive overshoot occurs at the output terminal 109 when a power supply voltage becomes higher from a state in which the power supply voltage is low and the output terminal 109 outputs a voltage lower than a predetermined output voltage Vout (hereinafter referred to as "non-regulated state"). In order to prevent the excessive overshoot, it is necessary to increase the current supplied from the bias circuit 302 for the amplifier 301, and hence there is another problem in that the voltage regulator is increased in current consumption.

SUMMARY OF THE INVENTION

The present invention has been made in view of the above-mentioned problems, and provides a voltage regulator that is low in current consumption and is capable of suppressing the occurrence of an excessive overshoot at an output terminal when a power supply voltage becomes high in a non-regulated state.

In order to solve the conventional problems, a voltage regulator including an overshoot suppression circuit according to one embodiment of the present invention is configured as follows.

The voltage regulator includes: an overshoot limiting circuit for detecting an occurrence of an overshoot in an output voltage and limiting a current of an output transistor; and a non-regulated state detection circuit for detecting that the voltage regulator is in a non-regulated state based on a voltage of an output terminal and a current flowing through the output transistor. The overshoot limiting circuit has an operating current controlled by a detection signal of the non-regulated state detection circuit.

The voltage regulator including the overshoot suppression circuit according to one embodiment of the present invention has the effect that the current consumption is low and the overshoot of the output voltage that occurs when the power supply voltage becomes high in the non-regulated state can be suppressed.

DETAILED DESCRIPTION OF THE PREFERRED EMBODIMENTS

Embodiments of the present invention are described below with reference to the accompanying drawings.

First Embodiment

Figure 1:
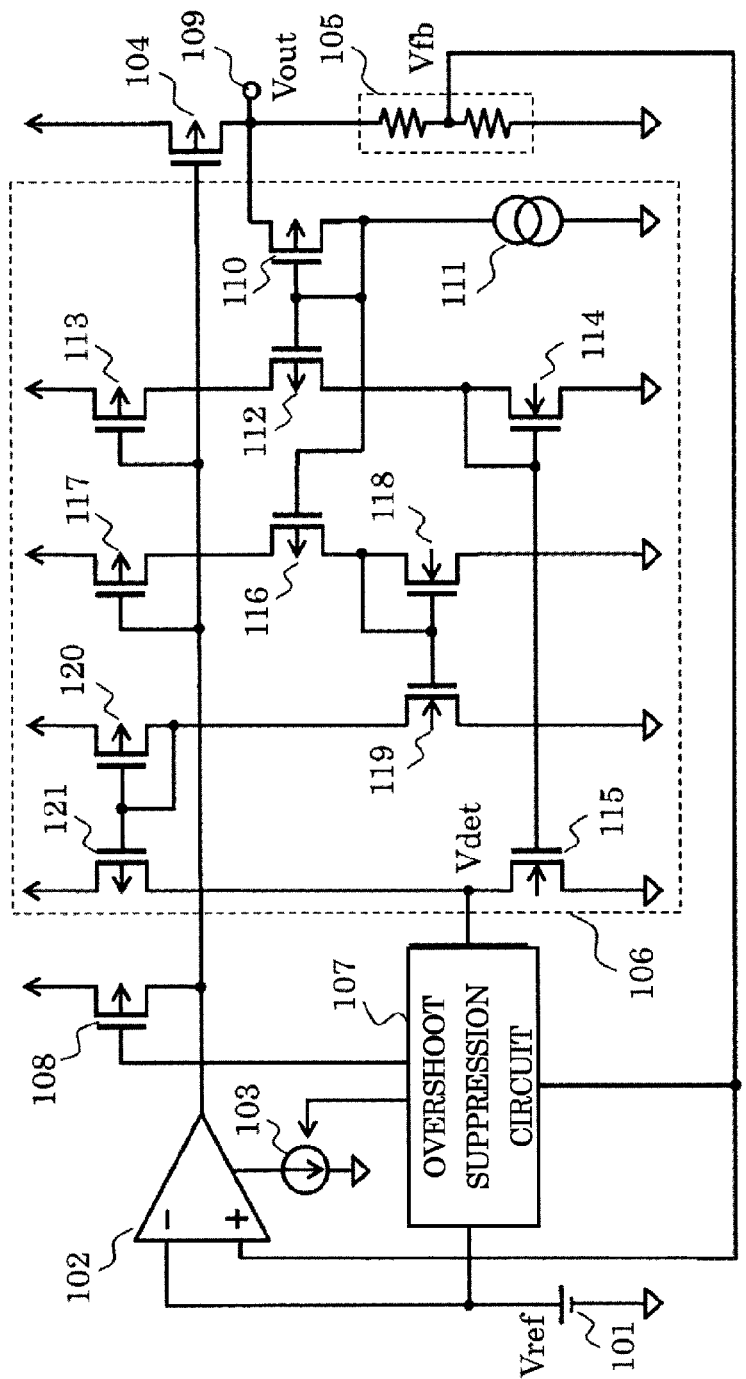
FIG. 1 is a circuit diagram of a voltage regulator including an overshoot suppression circuit according to a first embodiment of the present invention.

FIG. 1 is a circuit diagram of a voltage regulator including an overshoot suppression circuit according to a first embodiment of the present invention.

The voltage regulator according to this embodiment includes a reference voltage circuit 101, an error amplifier circuit 102, a bias circuit 103 for the error amplifier circuit 102, an output transistor 104, a voltage dividing resistor circuit 105, a non-regulated state detection circuit 106, an overshoot control circuit 107, and a PMOS transistor 108. The non-regulated state detection circuit 106 and the overshoot control circuit 107 constitute the overshoot suppression circuit.

The voltage dividing resistor circuit 105 is connected between an output terminal 109 and a ground terminal. The error amplifier circuit 102 has a non-inverting input terminal for inputting a feedback voltage Vfb and an inverting input terminal for inputting a reference voltage Vref. The output transistor 104 has a gate connected to an output terminal of the error amplifier circuit 102, a source connected to a power supply terminal, and a drain connected to the output terminal 109. The non-regulated state detection circuit 106 inputs a voltage of the output terminal 109 and a voltage of the power supply terminal, and has an output terminal connected to the overshoot control circuit 107. The overshoot control circuit 107 inputs the feedback voltage Vfb and the reference voltage Vref, and has output terminals connected to the bias circuit 103 and a gate of the PMOS transistor 108.

The voltage dividing resistor circuit 105 divides an output voltage Vout of the output terminal 109 to output the feedback voltage Vfb. The error amplifier circuit 102 compares the feedback voltage Vfb with the reference voltage Vref output from the reference voltage circuit 101. The output transistor 104 is controlled by an output voltage of the error amplifier circuit 102, and has the function of maintaining the voltage of the output terminal 109 to be constant. The non-regulated state detection circuit 106 detects a non-regulated state based on a current flowing through the output transistor 104 and the output voltage Vout of the output terminal 109. The overshoot control circuit 107 detects an overshoot at the output terminal 109 based on the reference voltage Vref and the feedback voltage Vfb, and controls the PMOS transistor 108 and the bias circuit 103. In response to a detection signal Vdet of the non-regulated state detection circuit 106, the overshoot control circuit 107 controls an operating current of the overshoot control circuit 107.

Figure 3:
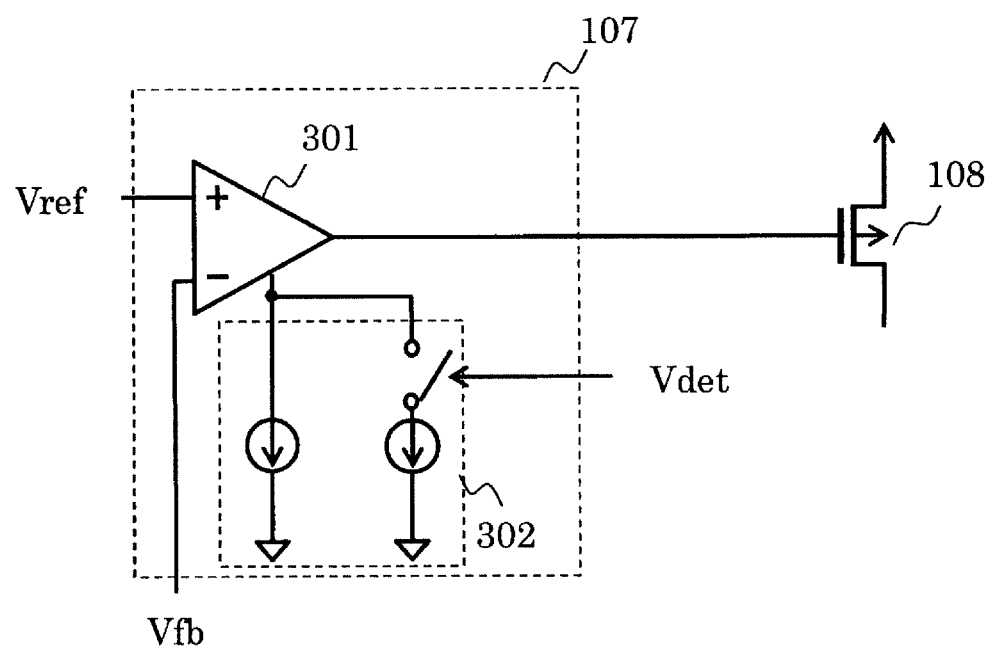
FIG. 3 is a circuit diagram illustrating an exemplary overshoot control circuit according to the embodiments of the present invention.
Figure 4:
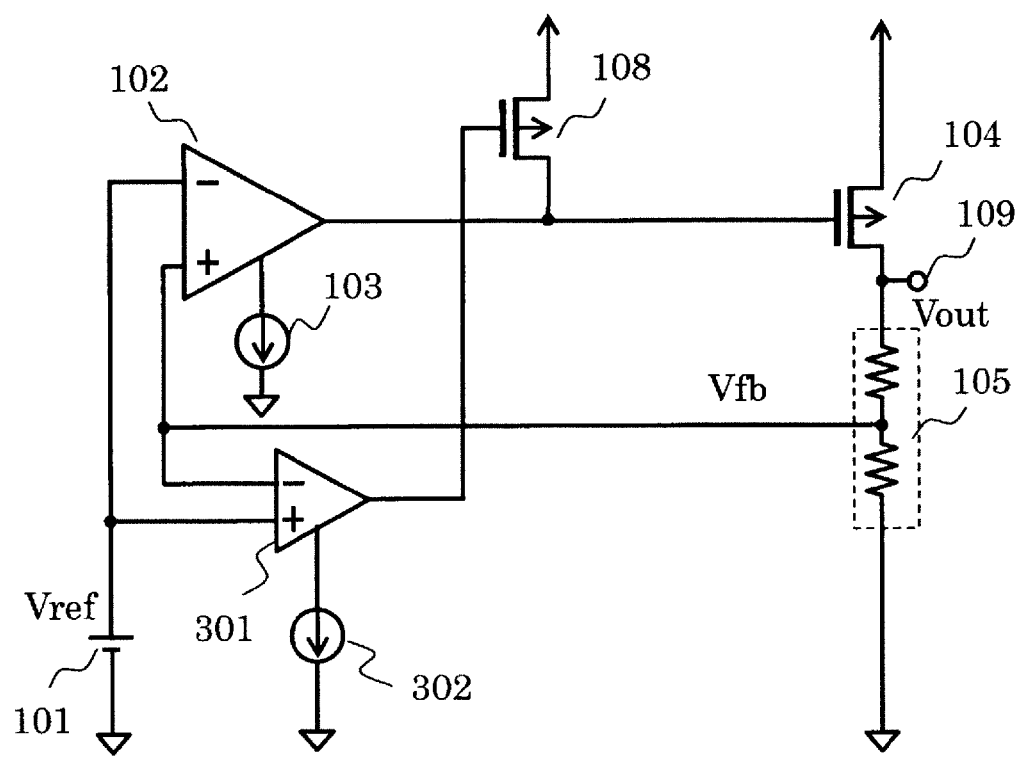
FIG. 4 is a circuit diagram of a conventional voltage regulator including an overshoot suppression circuit.

The overshoot control circuit 107 is formed of a circuit illustrated in FIG. 3, for example. The overshoot control circuit 107 illustrated in FIG. 3 includes an amplifier 301 for inputting the reference voltage Vref and the feedback voltage Vfb, and a bias circuit 302 for inputting the detection signal Vdet of the non-regulated state detection circuit 106 and controlling an operating current of the amplifier 301.

Note that, the overshoot control circuit 107 only needs to be a circuit for realizing the function of detecting an overshoot at the output terminal 109, and the circuit configuration is not particularly limited. Further, the bias circuit 103 only needs to be a constant current circuit for increasing the current in response to a signal of the overshoot control circuit 107, and the circuit configuration is not particularly limited.

The non-regulated state detection circuit 106 includes PMOS transistors 110, 112, 113, 116, 117, 120, and 121, NMOS transistors 114, 115, 118, and 119, and a constant current source 111.

The PMOS transistor 110 has a source connected to the output terminal 109, and a gate and a drain connected to the constant current source 111. The PMOS transistor 112 has a source connected to a drain of the PMOS transistor 113, a gate connected to the gate and the drain of the PMOS transistor 110, and a drain connected to a gate and a drain of the NMOS transistor 114. The PMOS transistor 113 has a source connected to the power supply terminal, and a gate connected to the output terminal of the error amplifier circuit 102. The NMOS transistor 114 has a source connected to the ground terminal, and a gate and a drain connected to a gate of the NMOS transistor 115. The PMOS transistor 116 has a source connected to a drain of the PMOS transistor 117, a gate connected to the gate and the drain of the PMOS transistor 110, and a drain connected to a gate and a drain of the NMOS transistor 118. The PMOS transistor 117 has a source connected to the power supply terminal, and a gate connected to the output terminal of the error amplifier circuit 102. The NMOS transistor 118 has a source connected to the ground terminal, and a gate and a drain connected to a gate of the NMOS transistor 119. The NMOS transistor 119 has a source connected to the ground terminal, and a drain connected to a gate and a drain of the PMOS transistor 120. The PMOS transistor 120 has a source connected to the power supply terminal, and a gate and a drain connected to a gate of the PMOS transistor 121. The PMOS transistor 121 and the NMOS transistor 115 are connected between the power supply terminal and the ground terminal, and a connection node thereof is the output terminal of the non-regulated state detection circuit 106.

The PMOS transistor 110 and the constant current source 111 detect a state of the output terminal 109. The PMOS transistor 112, the PMOS transistor 113, and the NMOS transistor 114 constitute a first detection circuit. The first detection circuit outputs a detection result of the state of the output terminal 109 to the gate of the NMOS transistor 115. The PMOS transistor 116, the PMOS transistor 117, the NMOS transistor 118, the NMOS transistor 119, and the PMOS transistor 120 constitute a second detection circuit. The second detection circuit outputs the detection result of the state of the output terminal 109 to the gate of the PMOS transistor 121. The currents to be supplied by the PMOS transistor 121 and the NMOS transistor 115 are changed in accordance with the signals input to the respective gates thereof, and the signal Vdet is output to the output terminal of the non-regulated state detection circuit 106 based on a balance of the currents.

The above-mentioned overshoot suppression circuit operates as follows to suppress an overshoot at the output terminal 109.

The state in which the power supply voltage is sufficiently high and the output voltage Vout of the output terminal 109 is close to a predetermined voltage is referred to as "normal state". The state in which the power supply voltage is low and the output terminal 109 outputs a voltage lower than a predetermined output voltage Vout is referred to as "non-regulated state".

Each transistor in the non-regulated state detection circuit 106 is designed as follows, for example.

The PMOS transistor 113 and the PMOS transistor 117 for mirroring a current of the output transistor 104 are designed so that the PMOS transistor 113 has a larger mirror ratio. The PMOS transistor 112 and the PMOS transistor 116 for minoring a current of the PMOS transistor 110 are designed so that the PMOS transistor 116 has a larger mirror ratio. The PMOS transistors 112, 113, 116, and 117 are designed so that the currents supplied by the PMOS transistor 112 and the PMOS transistor 116 are sufficiently larger than the currents supplied by the PMOS transistor 113 and the PMOS transistor 117 in the normal state.

In the normal operating state, the PMOS transistor 113 allows a larger current to flow than the current of the PMOS transistor 117. As a result of mirroring those currents, the NMOS transistor 115 allows a larger current to flow than the current of the PMOS transistor 121. Accordingly, the non-regulated state detection circuit 106 outputs a signal Vdet of Lo to the output terminal, thereby indicating that the output transistor 104 is in a saturated state.

In response to the signal Vdet of Lo, the overshoot control circuit 107 reduces the operating current to enter the normal state.

When the voltage regulator enters the non-regulated state, the difference between the power supply voltage and the output voltage Vout is reduced. The output voltage Vout is low, and hence a voltage of Lo is input to the gates of the PMOS transistor 113 and the PMOS transistor 117 so that the PMOS transistor 113 and the PMOS transistor 117 are turned ON. Accordingly, drain voltages of the PMOS transistor 113 and the PMOS transistor 117 become the power supply voltage. In other words, the drain voltages of the PMOS transistor 113 and the PMOS transistor 117 become closer to the output voltage Vout. Even with the low output voltage Vout, the PMOS transistor 110 allows a current to flow because the current supplied from the bias circuit 111 is sufficiently small. Accordingly, a gate voltage of the PMOS transistor 110 becomes a voltage corresponding to the impedance of the bias circuit 111 and the PMOS transistor 110 and the output voltage Vout. Then, gate voltages of the PMOS transistor 112 and the PMOS transistor 116 are equal to the gate voltage of the PMOS transistor 110. Further, source voltages of the PMOS transistor 112 and the PMOS transistor 116 are determined by the gate voltage of the PMOS transistor 110 and thresholds of the PMOS transistor 112 and the PMOS transistor 116.

In this state, the currents supplied by the PMOS transistor 112 and the PMOS transistor 116 are smaller than the currents supplied by the PMOS transistor 113 and the PMOS transistor 117. Accordingly, the PMOS transistor 116 allows a larger current to flow than the current of the PMOS transistor 112 because the mirror ratio of the PMOS transistor 116 is larger than that of the PMOS transistor 112. As a result of mirroring those currents, the PMOS transistor 121 allows a larger current to flow than the current of the NMOS transistor 115. Accordingly, the non-regulated state detection circuit 106 outputs a signal Vdet of Hi to the output terminal, thereby indicating that the voltage regulator is in the non-regulated state.

In response to the signal Vdet of Hi, the overshoot control circuit 107 increases the operating current to enter a high-speed operating state. Accordingly, even when the power supply voltage is increased from this state and an overshoot occurs at the output terminal 109, the overshoot control circuit 107 can detect the overshoot quickly to control the bias circuit 103 and the PMOS transistor 108. Consequently, the overshoot at the output terminal 109 can be suppressed.

As described above, the overshoot suppression circuit for the voltage regulator according to this embodiment enters, in the normal state, a low consumption state in which the operating current of the overshoot control circuit 107 is small, and hence the current consumption can be reduced. Besides, when the non-regulated state detection circuit 106 detects the non-regulated state of the voltage regulator, the operating current of the overshoot control circuit 107 is increased, and hence the overshoot at the output terminal 109 can be suppressed quickly.

Second Embodiment

Figure 2:
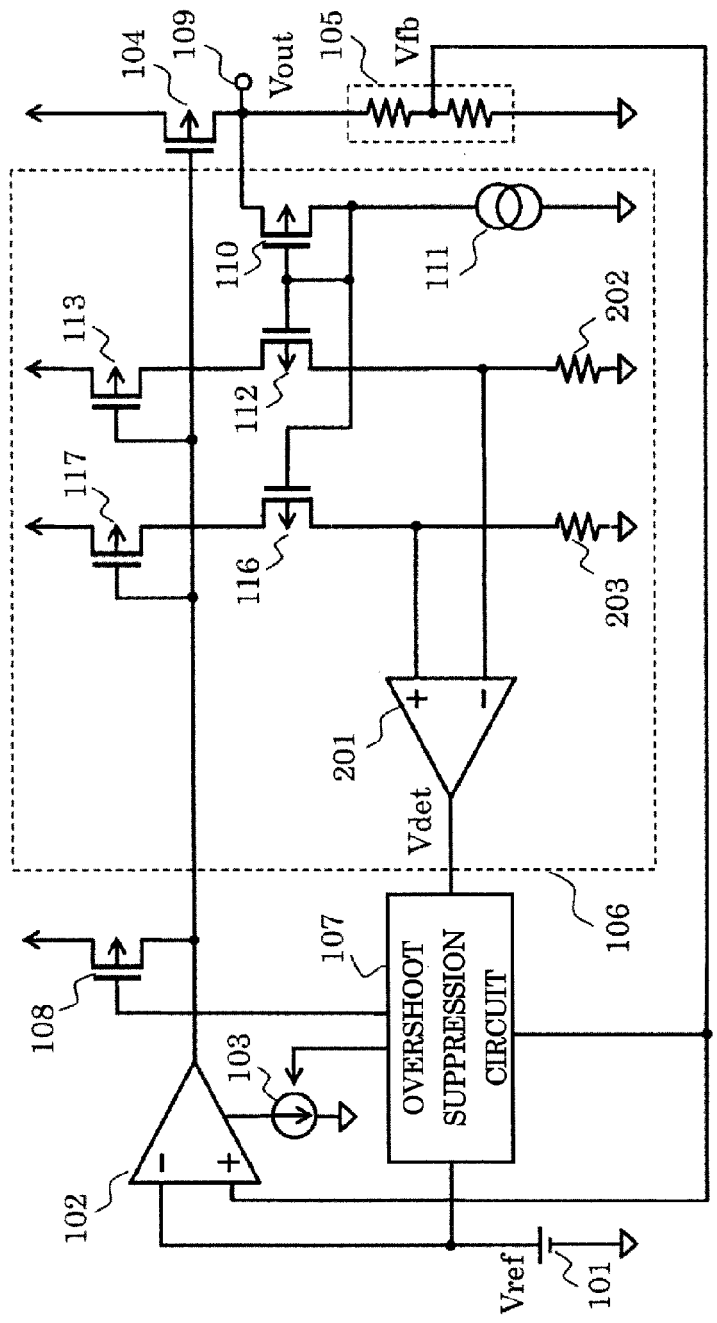
FIG. 2 is a circuit diagram of a voltage regulator including an overshoot suppression circuit according to a second embodiment of the present invention.

FIG. 2 illustrates a circuit diagram of a voltage regulator according to a second embodiment of the present invention. In the voltage regulator according to the second embodiment, the non-regulated state detection circuit 106 is configured as follows.

The first detection circuit is formed of the PMOS transistor 112, the PMOS transistor 113, and a resistor 202. The second detection circuit is formed of the PMOS transistor 116, the PMOS transistor 117, and a resistor 203. An output terminal of a comparator circuit 201 for inputting respective detection results serves as the output terminal of the non-regulated state detection circuit 106.

Even with this circuit configuration, similar effects as in the first embodiment can be obtained.

As described above, according to the voltage regulator of this embodiment, in the normal state, an unnecessary current is prevented from flowing through the overshoot suppression circuit, and hence the effect of reducing the current consumption can be obtained.

Note that, in the above description, the voltage regulator according to the embodiments of the present invention is configured so that, when an overshoot is detected, the current of the output transistor 104 is decreased while the current of the bias circuit 103 is increased in response to the signal from the overshoot control circuit 107. Alternatively, however, even with a configuration in which only one of the current of the output transistor 104 and the current of the bias circuit 103 is controlled based on the signal from the overshoot control circuit 107, the effect of suppressing the overshoot can be obtained, and hence the present invention is not limited to the configuration described above.

What is claimed is:

1. A voltage regulator, comprising:
   an error amplifier circuit for amplifying a difference between a divided voltage obtained by dividing an output voltage output from an output transistor and a reference voltage, and outputting the amplified difference to control a gate of the output transistor;
   an overshoot limiting circuit having a first terminal for receiving a voltage proportional to the output voltage, the overshoot limiting circuit being configured to detect an occurrence of an overshoot in the output voltage and to limit a current of the output transistor; and
   a non-regulated state detection circuit configured to detect that the voltage regulator is in a non-regulated state based on the output voltage and the current flowing through the output transistor and to generate a detection signal indicative of the voltage regulator being in the non-regulated state,
   wherein the overshoot limiting circuit includes a second terminal for receiving the detection signal, wherein an operating current of the overshoot limiting circuit increases when the detection signal indicates that the voltage regulator is in the non-regulated state,
   wherein the non-regulated state detection circuit comprises:
      a first detection circuit and a second detection circuit; and
      an output circuit for outputting a detection signal by inputting an output of the first detection circuit and an output of the second detection circuit,
   wherein: in a normal state, the first detection circuit allows a larger current to flow than a current of the second detection circuit; and in a non-regulated state, the second detection circuit allows a larger current to flow than a current of the first detection circuit, and
   wherein the output circuit outputs the detection signal in accordance with the current of the first detection circuit and the current of the second detection circuit.

2. A voltage regulator according to claim 1,
   wherein the first detection circuit and the second detection circuit each comprise a circuit for converting a current into a voltage, and
   wherein the output circuit outputs the detection signal in accordance with a voltage obtained by converting the current of the first detection circuit and a voltage obtained by converting the current of the second detection circuit.

* * * * *